(12) United States Patent
Johnson

(10) Patent No.: US 12,440,060 B2
(45) Date of Patent: Oct. 14, 2025

(54) BOTTLE WARMERS WITH ADAPTERS

(71) Applicant: MUNCHKIN, INC., Van Nuys, CA (US)

(72) Inventor: Kevin Douglas Johnson, Tarzana, CA (US)

(73) Assignee: MUNCHKIN, INC., Van Nuys, CA (US)

( * ) Notice: Subject to any disclaimer, the term of this patent is extended or adjusted under 35 U.S.C. 154(b) by 153 days.

(21) Appl. No.: 18/099,230

(22) Filed: Jan. 19, 2023

(65) Prior Publication Data

US 2023/0225550 A1  Jul. 20, 2023

Related U.S. Application Data

(60) Provisional application No. 63/301,004, filed on Jan. 19, 2022.

(51) Int. Cl.
*A47J 36/24* (2006.01)

(52) U.S. Cl.
CPC ....... *A47J 36/2411* (2013.01); *A47J 36/2433* (2013.01)

(58) Field of Classification Search
CPC .......................... A47J 36/2411; A47J 36/2433
USPC ....... 219/628, 600, 618, 626, 627, 630, 635, 219/663, 665, 240, 386, 435, 436, 437, 219/438, 441, 433, 523; 99/483
See application file for complete search history.

(56) References Cited

U.S. PATENT DOCUMENTS

| | | | |
|---|---|---|---|
| 9,138,097 B2 * | 9/2015 | Driel ................... | A47J 36/2433 |
| 2006/0081599 A1 * | 4/2006 | Anderson ........... | A47J 36/2433 219/438 |

* cited by examiner

*Primary Examiner* — Quang T Van
(74) *Attorney, Agent, or Firm* — ArentFox Schiff LLP

(57) ABSTRACT

A bottle warmer assembly includes a base having a heating element, and a threaded portion which may be connected directly to a bottle or through an intermediary adapter. One or more seals may be used between the base and the bottle and adapter such that the bottle warmer is universal and may be used to heat any design and configuration of bottles.

17 Claims, 19 Drawing Sheets

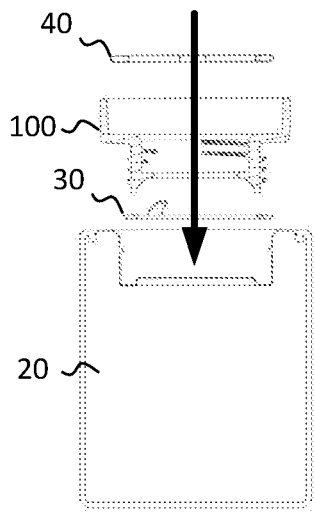
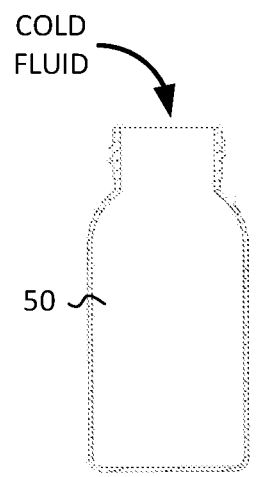
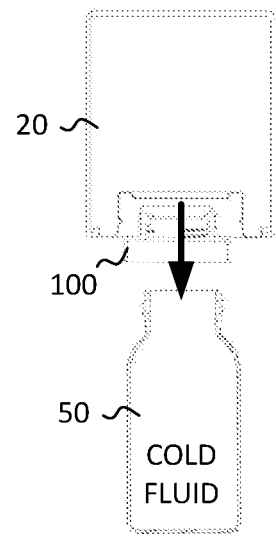
FIG. 1C    FIG. 1D    FIG. 1E
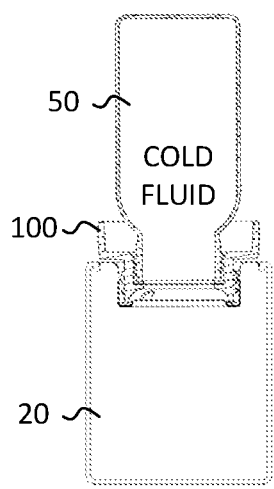
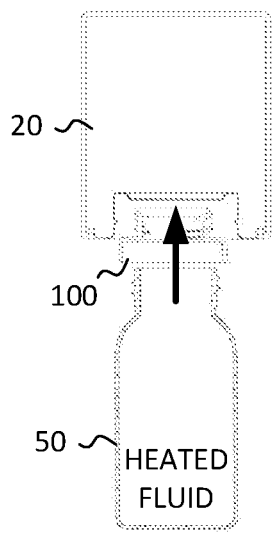
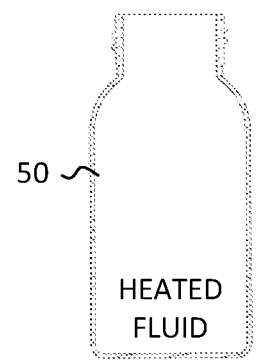
FIG. 1F    FIG. 1G    FIG. 1H

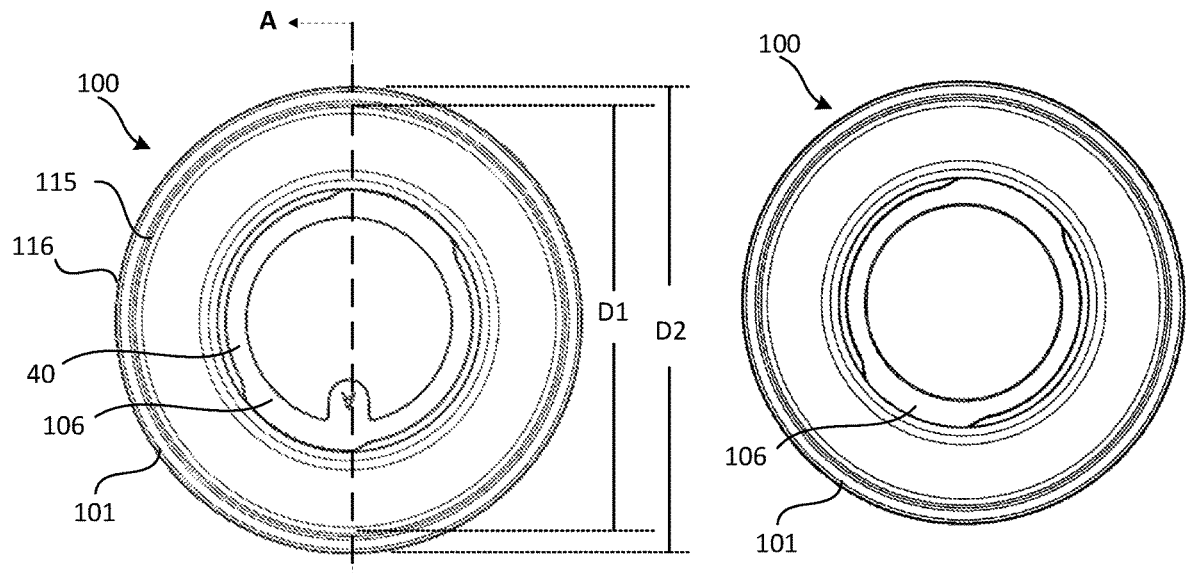
FIG. 9A
FIG. 9B
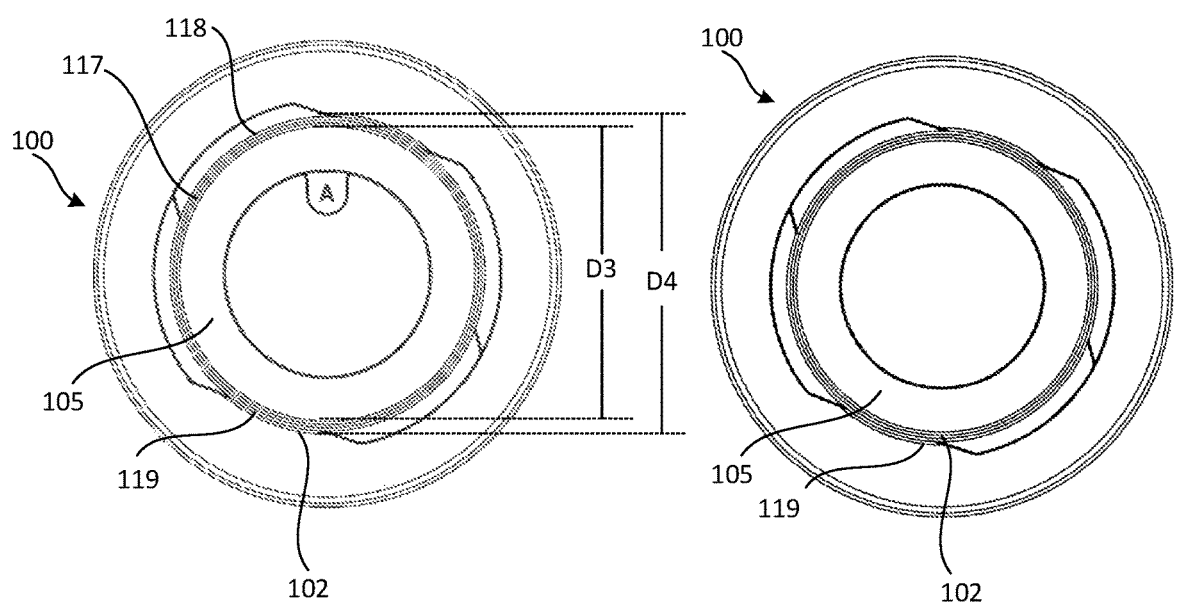
FIG. 10A
FIG. 10B

BOTTLE WARMERS WITH ADAPTERS

This Patent Applications claims priority to U.S. Provisional Patent Application Ser. No. 63/301,004, filed Jan. 19, 2022, the content of which is hereby incorporated by reference herein in its entirety into this disclosure.

TECHNICAL FIELD

The subject disclosure relates generally to bottle warmers with adapters. More particularly, the present disclosure relates to bottle warming apparatus having adapters that securely fasten to various types of bottles.

BACKGROUND

Warming up breast milk or formula is one of the most commonly performed actions of a parent or caretaker. The purpose of warming up the milk before providing to an infant or toddler is to ensure that the temperature of the milk is as close to natural temperature as possible. It is common for infants or toddlers to have reflux when the temperature of the milk is too cold. Alternatively, if the temperature of the milk is too hot, the infant or toddler may be burned.

Conventional bottle warmers include a water chamber which serves as a bath for which a bottle of formula or milk is placed therein for a given period of time. However, such conventional bath-like bottle warmers tend to corrode from the long time exposure to the water, and may become a cesspool for bacterial growth, which can then be transferred to the bottle and/or attached nipple, which are placed therein. Such harmful contact with bacteria could potentially harm the infant or toddler that uses a bottle that has been heated in conventional bath-like bottle warmers.

SUMMARY

The present subject disclosure describes a bottle warmer having a base portion with a threaded top which can attach directly to a bottle. Alternatively, any number of adapters may be used which attach the base portion with any number of bottles from different manufacturers. The bottle warmer adapter may be shaped like a cylindrical sleeve having a first end and a second end. The adapter has a first skirt portion with a larger diameter at the first end, and a second skirt portion with a smaller diameter at the second end. Two fasteners are located on the adapter; one on the outer wall of the second skirt portion and one on the inner wall of the second skirt portion. An inward ledge is formed from a concave fillet extending from the second end towards the first end. The adapter contains a base seal to create a watertight seal between the adapter and another object. The adapter contains a bottle seal, situated on the ledge, to create a watertight seal between the adapter and a bottle.

In one exemplary embodiment, the present subject disclosure is a bottle warmer. The bottle warmer includes a base housing having an internal heating element, and an open top chamber with a threaded interior which is adapted to mate with an inverted bottle or an adapter; a circular channel positioned at a base portion of the top chamber; and a circular base seal adapted to fit within the channel and create a leak-proof barrier with a bottle or an adapter attached to the top chamber, the base seal having pull tab to facilitate removal from the circular channel.

In another exemplary embodiment, the present subject disclosure is a bottle warmer. The bottle warmer includes a base housing having an internal heating element, and an open top chamber with a threaded interior which is adapted to mate with an inverted bottle or an adapter; a circular channel positioned at a base portion of the top chamber; a circular base seal adapted to fit within the channel and create a leak-proof barrier with a bottle or an adapter attached to the top chamber, the base seal having pull tab to facilitate removal from the circular channel; and an adapter having a first skirt portion and a second skirt portion, wherein the first skirt portion has a threaded interior wall which is adapted to mate with the threaded portion of a bottle, and the second skirt portion has a threaded exterior wall which is adapted to mate with the threaded interior of the top chamber.

In yet another exemplary embodiment, the present subject disclosure is a bottle warmer. The bottle warmer includes a base housing having an internal heating element, and an open top chamber with a threaded interior which is adapted to mate with an inverted bottle or an adapter; a circular channel positioned at a base portion of the top chamber; a circular base seal adapted to fit within the channel and create a leak-proof barrier with a bottle or an adapter attached to the top chamber, the base seal having pull tab to facilitate removal from the circular channel; and an adapter having a first skirt portion and a second skirt portion, wherein the first skirt portion has a threaded interior wall which is adapted to mate with the threaded portion of a bottle, and the second skirt portion has a threaded exterior wall which is adapted to mate with the threaded interior of the top chamber.

BRIEF DESCRIPTION OF THE DRAWINGS

Various exemplary embodiments of this disclosure will be described in detail, wherein like reference numerals refer to identical or similar components or steps, with reference to the following figures, wherein:

FIGS. 1C-1H show a sequence of steps to heat up a fluid, according to an exemplary embodiment of the present subject disclosure.

FIG. 9A is a top view of the adapter and the bottle seal situated within, according to an exemplary embodiment of the present subject disclosure.

FIG. 9B is a top view of the adapter with the bottle seal removed, according to an exemplary embodiment of the present subject disclosure.

FIG. 10A is a bottom view of the adapter and the bottle seal situated within, according to an exemplary embodiment of the present subject disclosure.

FIG. 10B is a bottom view of the adapter with the bottle seal removed, according to an exemplary embodiment of the present subject disclosure.

DETAILED DESCRIPTION

Particular embodiments of a bottle warmer with adapter will now be described in greater detail with reference to the figures.

Figure 1A:
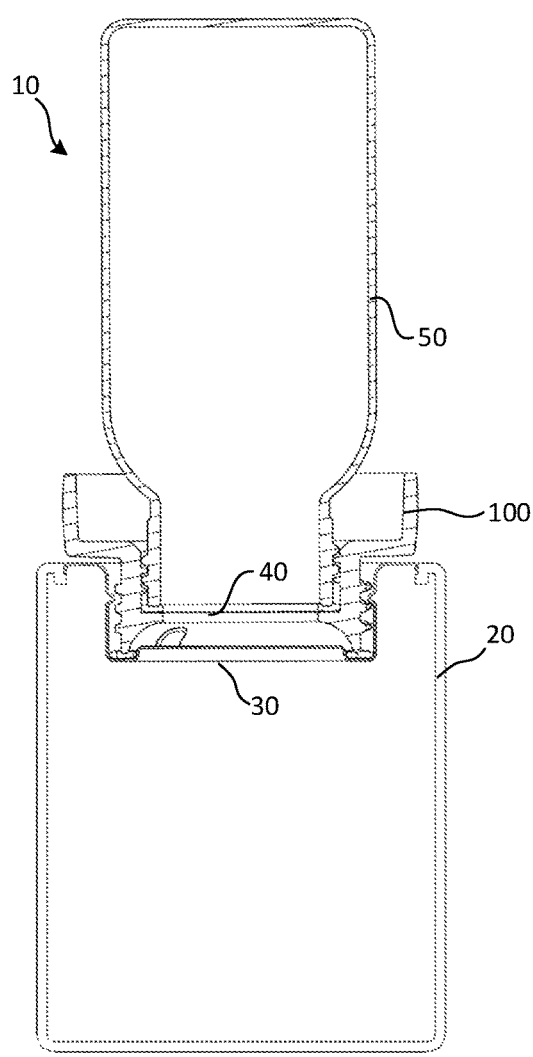
FIG. 1A is a sectional view of the bottle warmer assembly, according to an exemplary embodiment of the present subject disclosure.
Figure 1B:
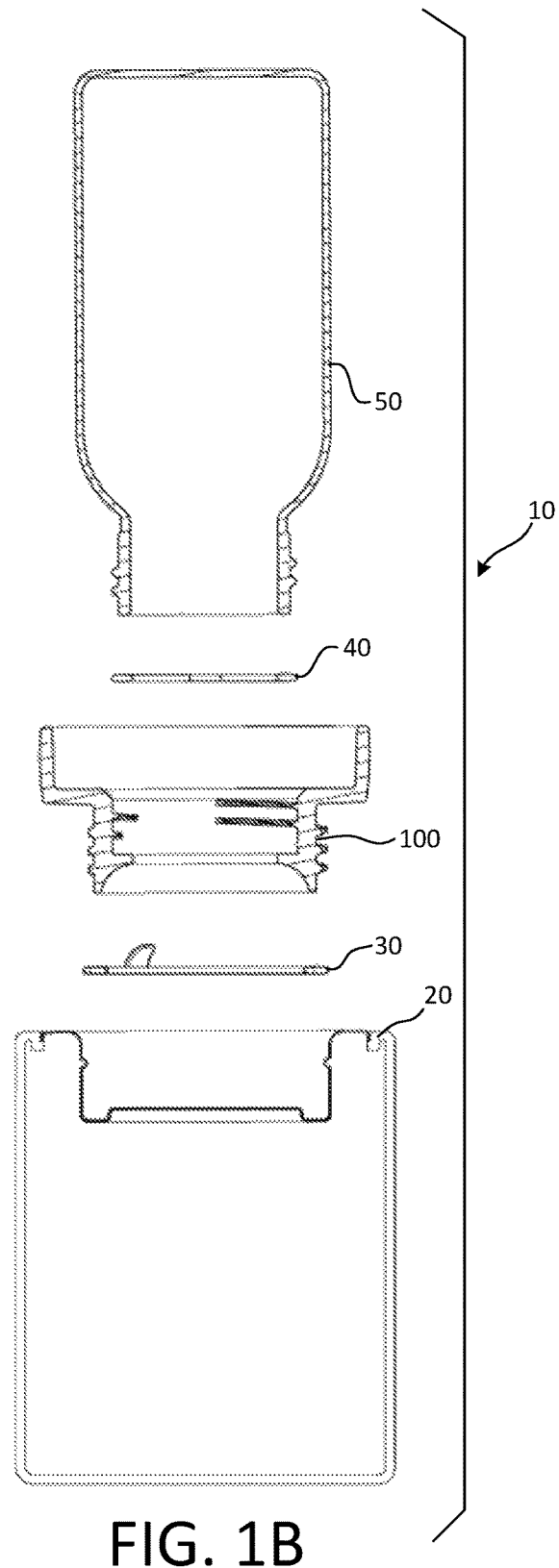
FIG. 1B is an exploded sectional view of the bottle warmer assembly, according to an exemplary embodiment of the present subject disclosure.

FIGS. 1A and 1B show a bottle warmer assembly 10 in both connected (FIG. 1A) and exploded (FIG. 1B) configurations. The bottle warmer assembly 10 includes a base housing 20, a base seal 30, an adapter 100, a bottle seal 40 and a bottle 50.

Figure 2:
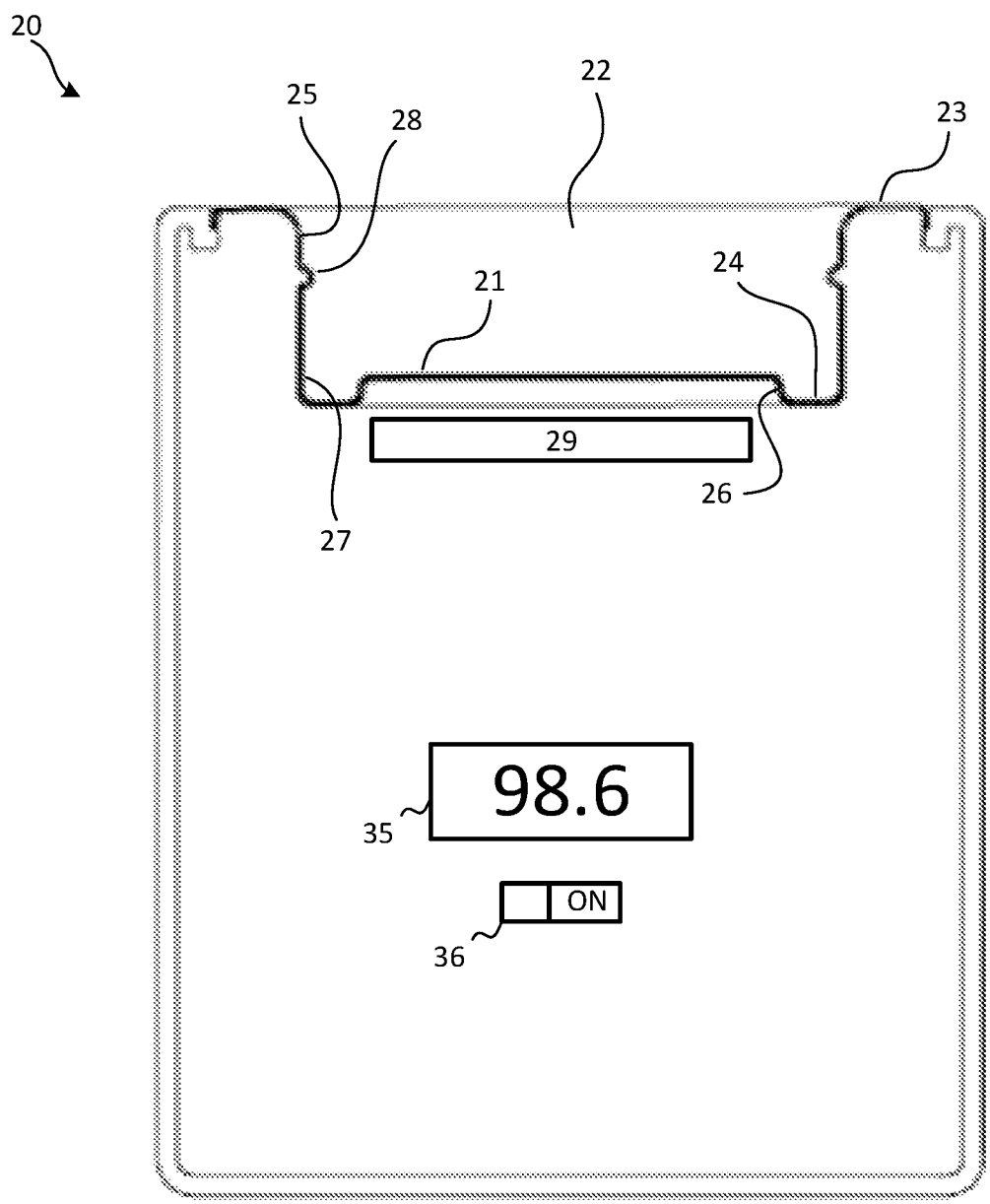
FIG. 2 is a side view of a base, according to an exemplary embodiment of the present subject disclosure.

FIG. 2 shows the base 20. The base 20 may include a heating element 29 for heating the bottle 50 and a liquid contained in the bottle 50. The top 23 of the base 20 may contain a radial chamber 22 that is U-shaped and having a surface 21 that is heated. The surface 21 may be made of metal but may be made with any other material that is capable of conducting heat and can withstand high temperatures. The surface 21 may be heated, and as a result, the liquid contained in the bottle 50 that comes into contact with the surface 21 is heated as well.

FIGS. 1C-1H show a simplified sequential series of steps that may be followed to operate the warmer assembly 10. FIG. 1C indicates that the proper fitting adapter 100 should be selected which corresponds to the particular bottle 50 that is to be used to heat up a fluid. Once the proper adapter 100 is selected, the proper base seal 30 and corresponding bottle seal 40 are placed in series as shown in FIG. 1C. The base seal 30 and bottle seal 40 may be marked with identifiers which correspond to the proper adapter 100 and facilitate the assembly process. FIG. 1D shows the step of filling the bottle 50 with fluid, which may be water, breast milk, juices, or other fluids, which ideally would be cold to room temperature. Step 1E shows that once the bottle 50 is filled with the desired amount of cold fluid, the assembled base 20 from FIG. 1C is then inverted and placed on top of the bottle 50. Since the adapter 100 has already been fastened to the base 20 as shown in FIG. 1C, the only action needed at FIG. 1E is to fasten the adapter 100 to the open end of the bottle 50. Once the base 20 is fastened to the bottle 50 such that the cold fluid does not leak out, the assembly is inverted so that the bottle 50 is on the top. FIG. 1F shows the assembled bottle 50 to the base 20 via the adapter 100. This is the step where the heating element 29 (see FIG. 2) within the base 20 is activated to cause the fluid within the bottle 50 to become heated up, as will be described in more detail below. The amount of time needed to heat the cold fluid to a desired temperature may be based on time or temperature sensors (not shown) within the base that measure the temperature of the heating element 29 or the cold fluid within the bottle 50. Once the fluid within the bottle 50 is heated up, the assembled bottle 50 to base 20 configuration of FIG. 1F is again inverted so that the bottle 50 is on the bottom and the base 20 is on top. The base 20 is then detached from the bottle 50, as shown in FIG. 1G. The base 20, adapter 100, base seal 30, and bottle seal 40 may then be cleaned and stored away. The heated fluid within the bottle 50 is now ready for use, as shown in FIG. 1H. A nipple top (not shown) may be attached to the bottle 50 so that the bottle is ready for us, or the heated fluid within the bottle 50 may be poured into another container as desired to use.

Although the series of steps shown in FIGS. 1C-1H may be the most common use of the warmer assembly, according to the present subject disclosure, other methods may also be used. For example, some bottles 50 may not need an adapter 100, and may be attached directly to the base 20. Also, multiple bottles 50 may be heated up in one series without having to wash or rinse the adapter 100 and corresponding seals, 30 and 40. Other methods are also possible and within the purview of one having ordinary skill in the art after consideration of the present description and accompanying drawings.

As shown in FIG. 2, the chamber 22 may contain fasteners 28 along radial walls 25 in order to secure an adapter 100 within the chamber 22. The fasteners 28 may be, for example, female threads, grooves, a friction fit, and/or any other sort of securing mechanism that will securely fasten the adapter 100 to the base 20. Alternatively, the fastener 28 may be embodied as male fasteners or threads to accommodate an adapter 100 with female fasteners or threads.

The transfer of heat from the heating element 29 and to and between the surface 21 and the adapter 100 is designed to be at an optimal temperature at the surface 21 so that the liquid in the bottle 50 does not exceed 100 degrees Fahrenheit. A digital display 35 and on/off button 36 assist in the operation of the base 20. The digital display 35 indicates the temperature of the heating element 29. A source of power (not shown) may be direct and/or alternating current. The base of the chamber 22 contains a circular ring-like channel 24. As show in FIGS. 2 and 16, an outer diameter 27 of the ring-like channel 24 is substantially flush with the radial walls 25 within the chamber 22. The distance between the outer diameter 27 and an inner diameter 26 of the channel 24 is large enough to securely accommodate a base seal 30 within the channel 24. The surface 21 at the bottom of the chamber 22 extends above the channel 24 to encapsulate the base seal 30. The base seal 30 ensures that a water-tight seal is created between the adapter 100 and the base 20.

Figure 3:
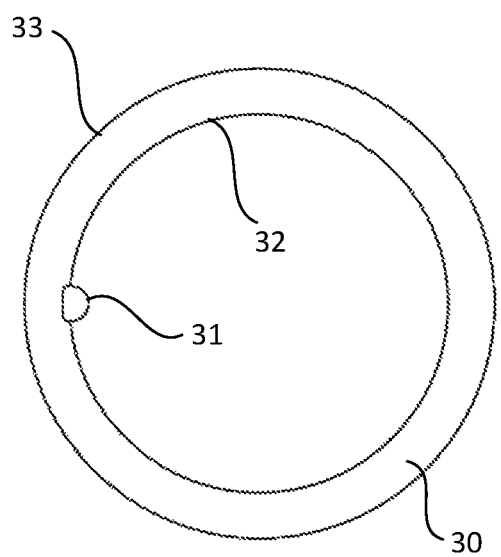
FIG. 3 is a top view of a base seal, according to an exemplary embodiment of the present subject disclosure.

As shown in FIG. 3, The base seal 30 is a circular flat ring made of a nonporous pliable material such as, for example, silicon, soft plastic, rubber, or any other suitable material capable of creating a watertight seal between the adapter 100 and the base 20. An outer diameter 33 of the base seal 30 is substantially similar to the outer diameter 27 of the channel 24 on the base 20 (see FIG. 2). An inner diameter 32 of the base seal 30 is substantially similar to the inner diameter 26 of the channel 24. The base seal 30 contains a pull tab 31 extending from the inner diameter 32 of the base seal 30. Alternatively, the pull tab 31 can be located on the outer diameter 33 of the base seal 30.

Indicia (not shown) may be disposed on the pull tab 31. The indicia may contain letters, numbers, or symbols. The indica allows the user to differentiate between the base seal 30 and the bottle seal 40. The indicia also allows a user to identify and differentiate various other base seals that are adapted to fit other bottle warmers.

The pull tab 31 extends inwardly at an upward angle relative to the base seal 30. The pull tab 31 is provided to allow a user to easily remove the base seal 30 from within the channel 24 (see FIG. 2). As a result, the base seal 30 rests securely in the channel 24 and the pull tab 31 extends at an angle out of the channel 24. The upward angle on the pull tab 31 allows the base seal 30 to rest in the channel 24 without being displaced by the pull tab 31. The base seal 30 rests in the channel 24 located at the bottom of the chamber 22.

Continuing in FIG. 3, a second end 102 of the adapter 100 (shown in FIGS. 10A and 10B) presses against the base seal 30, creating a watertight seal, when the adapter 100 is secured to the base 20. In position, an entire surface area 119 of the second end 102 will be in contact with, and substantially in between, the inner diameter 32 and outer diameter 33 of the base seal 30.

Figure 4:
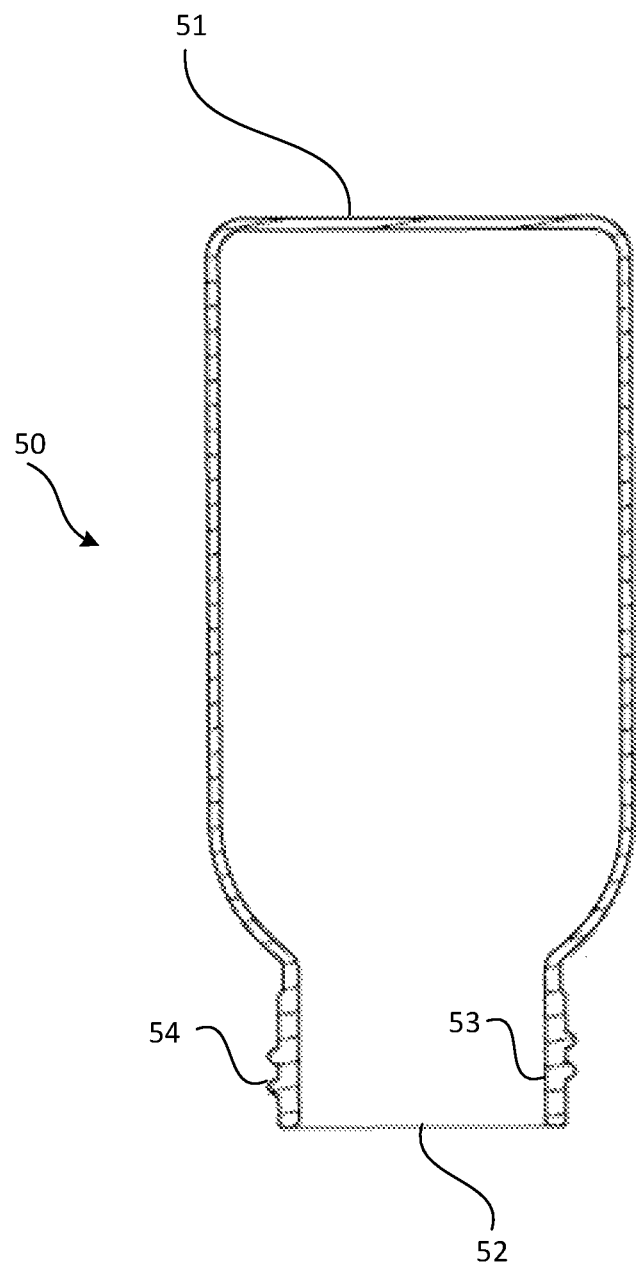
FIG. 4 is a cross section view of a bottle, according to an exemplary embodiment of the present subject disclosure.
Figure 16:
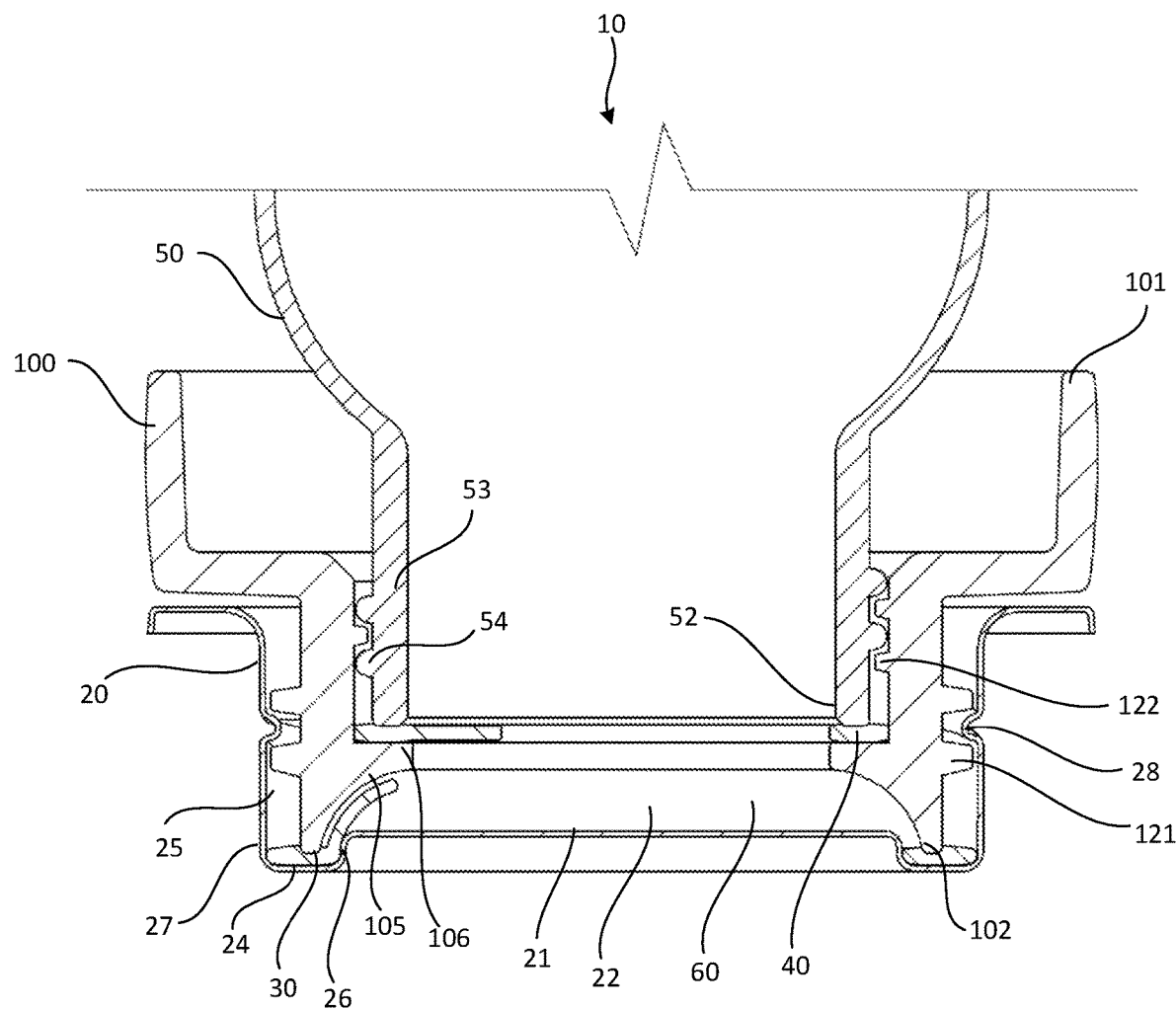
FIG. 16 is a partial cross section view of a bottle warmer assembly, excluding the bottom portion of the base, according to an exemplary embodiment of the present subject disclosure.

As shown in FIG. 4, which is a cross-sectional view of the bottle 50, the bottle 50 is a cylindrical container having a closed end 51 and an open end 52. The closed end 51 is larger in diameter. The open end 52 of the bottle 50 is smaller in diameter, defining a neck portion 53. The neck portion 53, may contain, for example, fasteners 54 such as male threads, snap caps or any other sort of mechanism used to attach the bottle 50 to another object and to secure a liquid within the bottle 50. Alternatively, female threads can be used as well. As shown in FIG. 16, the neck portion 53 is tightly secured to the adapter 100 using the fasteners 54 located on the neck portion 53 of the bottle 50 and the fasteners located on the adapter 100.

Figure 5:
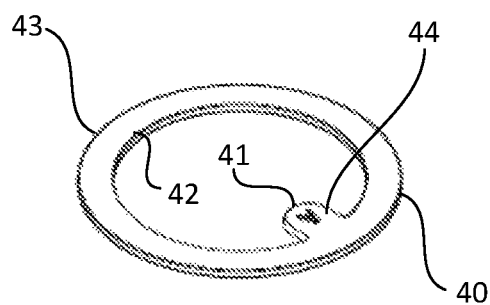
FIG. 5 is an upper perspective view of a bottle seal, according to an exemplary embodiment of the present subject disclosure.
Figure 6:
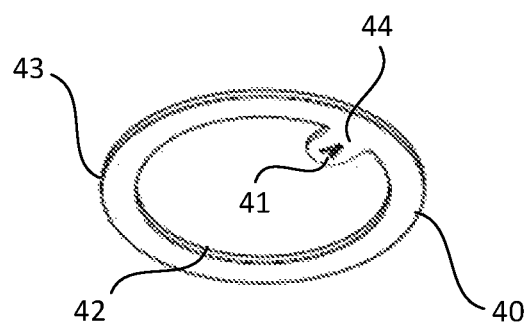
FIG. 6 is a lower perspective view of the bottle seal, according to an exemplary embodiment of the present subject disclosure.

FIGS. 5-6 show an upper and lower perspective view of a bottle seal 40. Similar to the base seal 30 (see FIG. 3), the bottle seal 40 is a circular flat ring made of a pliable material such as, for example, silicon, soft plastic, or rubber. The bottle seal 40 contains a pull tab 41 extending from an inner diameter 42 of the bottle seal 40 wherein an indicia 44 may be disposed. Alternatively, the pull tab 41 can be located on an outer diameter 43 of the ring. The pull tab 41 extends inwardly from the inner diameter 42 of the bottle seal 40. The indicia 44 is used to differentiate various bottle seals that are adapted to fit various sized bottle adapters. These various sized bottle adapters are used to accommodate various sized bottles from different manufacturers. The indicia 44 is located on the pull tab 41 and is facing upward towards the user in position.

Figure 7:
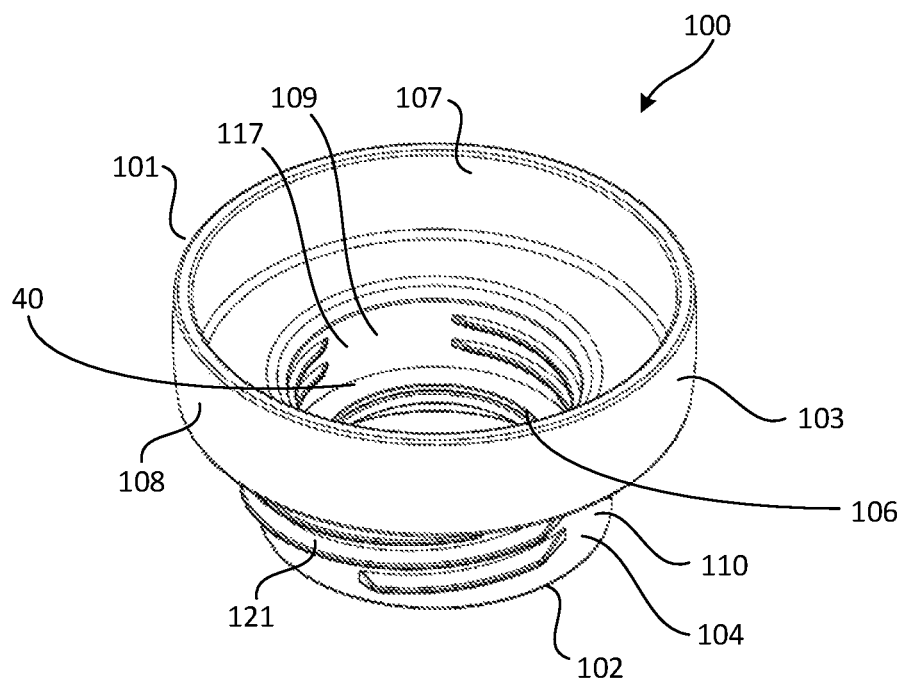
FIG. 7 is an upper perspective view of an adapter and the bottle seal situated within, according to an exemplary embodiment of the present subject disclosure.

As shown in FIGS. 7 and 16, the outer diameter 43 of the bottle seal 40 is substantially similar to an inner diameter 117 of a second end 102 of the adapter 100. The bottle seal 40 rests on a ledge 106 located within the adapter 100 and creates a watertight seal between the adapter 100 and the bottle 50 when the bottle 50 is securely attached to the adapter 100. The inner diameter 42 of the bottle seal 40 is substantially similar to a radial thickness of a ledge 106 located inside the adapter 100. The indicia 44 disposed on the bottle seal 40 will be different from that of the base seal 30 in order to differentiate both seals and their respective uses.

FIGS. 7-13 show one embodiment of the adapter 100 with a bottle seal 40 situated therein. The adapter 100 is a made of a non-pliable material such as a hard plastic like ABS. The adapter 100 is a cylindrical sleeve having a first end 101 and the second end 102 in which the first end 101 and the second end 102 may have differing diameters.

Figure 8:
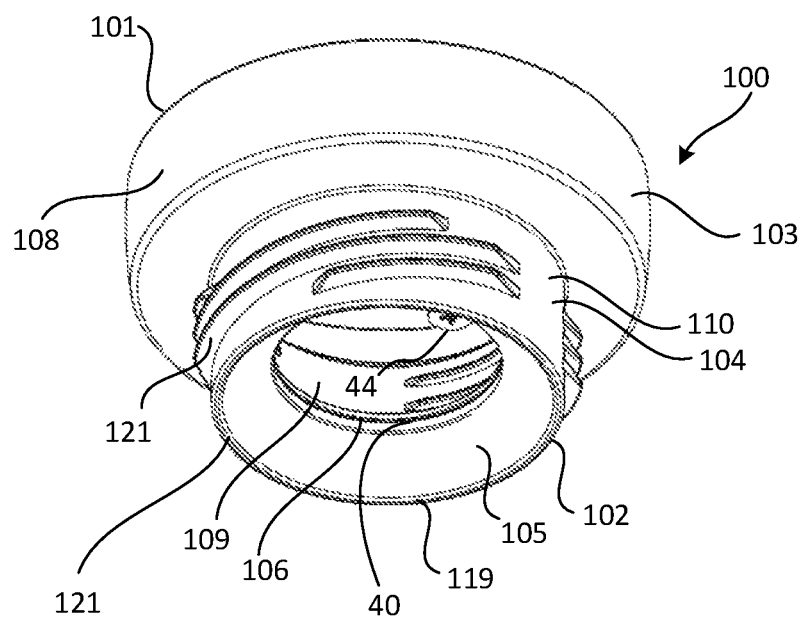
FIG. 8 is a lower perspective view of the adapter and the bottle seal situated within, according to an exemplary embodiment of the present subject disclosure.

As shown in FIGS. 7 and 8, the adapter 100 is comprised of a first skirt portion 103 and a second skirt portion 104 located along the cylindrical sleeve 100. The first skirt portion 103 extends from the first end 101 in a direction towards the second end 102. The second skirt portion 104 extends from the second end 102 in a direction towards the first end 101. The first skirt portion 103 and the second skirt portion 104 connect at a predetermined distance from the first end 101. The first skirt portion 103 contains a first interior wall 107 that is radial and a first exterior wall 108 that is radial. The second skirt portion 104 contains a second interior wall 109 that is radial and a second exterior wall 110 that is radial.

The second exterior wall 110 may contain male fasteners 121 such as threads, grooves, ridges, or any other sort of securing mechanism, in order to secure the adapter 100, and create a seal, between the adapter 100 and the radial walls 25 of the base 20 (see FIG. 2). Alternatively, the fasteners 121 may be female as well.

As shown in the top view of the adapter 100 in FIG. 9A (with botte seal 40) and 9B (without bottle seal 40), an inner diameter 115 of the first end 101 is defined as D1. D1 may be substantially similar to the outer diameter of the open end 52 of the bottle 50. Alternatively, the inner diameter 115 of the first end 101 may be larger than the outer diameter of the open end 52 of the bottle 50 such that a user can properly grip the first end 101 of the adapter 100. An outer diameter 116 of the first end 101 is defined as D2, such that the thickness (from D1 to D2) at the first end 101 is large enough to prevent the adapter 100 from breaking or deforming during normal use. D2 may be large enough to allow a use to grip the first skirt portion 103 when tightening the adapter 100 to the bottle 50 or the base 20.

A shown in FIG. 10A (with bottle seal 40) and 10B (without bottle seal 40), the outer diameter 118 of the second end 102 is defined as D4. D4 is substantially similar to the chamber 22 of the base 20. The inner diameter 117 of the second end 102 is defined as D3. D3 is substantially similar to the diameter of the open end 52 of the bottle 50. Alternatively, the inner diameter 117 of the second end 102 is shown as D3. D3 can have varying diameters. However, the diameter of D3 is constrained by D4 such that the thickness (from D3 to D4) of the adapter 100 is sufficient to prevent the adapter 100 from breaking or deforming during normal use. The thickness (from D3 to D4) of the adapter 100 may be smaller than the width of the base seal 30 (see FIG. 3) such that the surface area 119 at the second end 102 is substantially in contact with the base seal 30. That is, the surface area 119 of the second 102 is substantially in contact between the inner diameter 32 and the outer diameter 33 of the base seal 30.

As shown in FIGS. 8-10, the second interior wall 109 may contain a concave fillet 105 extending radially inwards into the radial center of the adapter 100, and upward from the second end 102 in the direction of the first end 101. As a result, the ledge 106 created by the fillet 105 extends radially inwards towards the radial center of the adapter 100. Alternatively, the ledge 106 can extend radially inward without the need for the concave fillet 105. The width of the ledge 106 is substantially similar to the width of the bottle seal 40 such that the bottle seal 40 will sit on the ledge 106.

Figure 11:
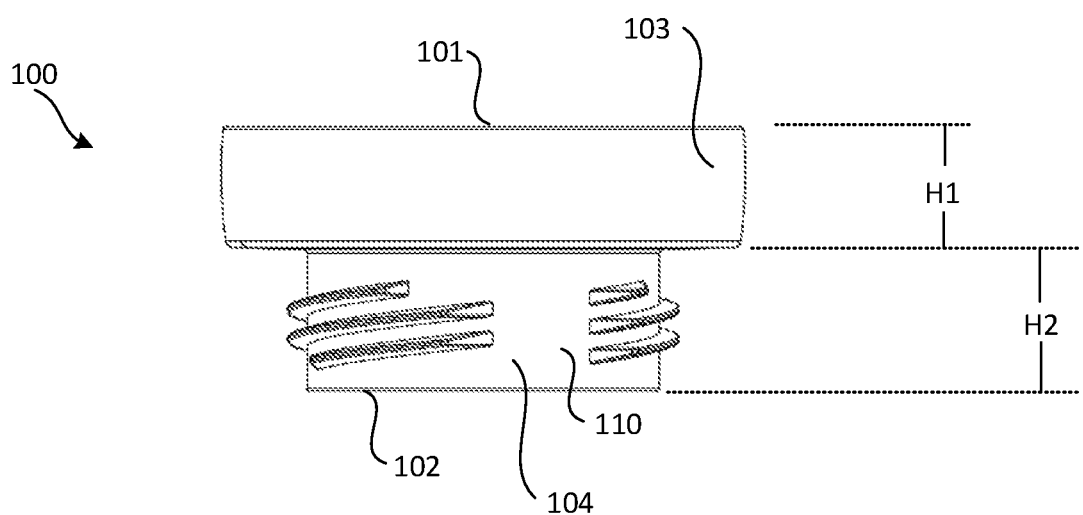
FIG. 11 is a side view of the adapter, according to an exemplary embodiment of the present subject disclosure.
Figure 12:
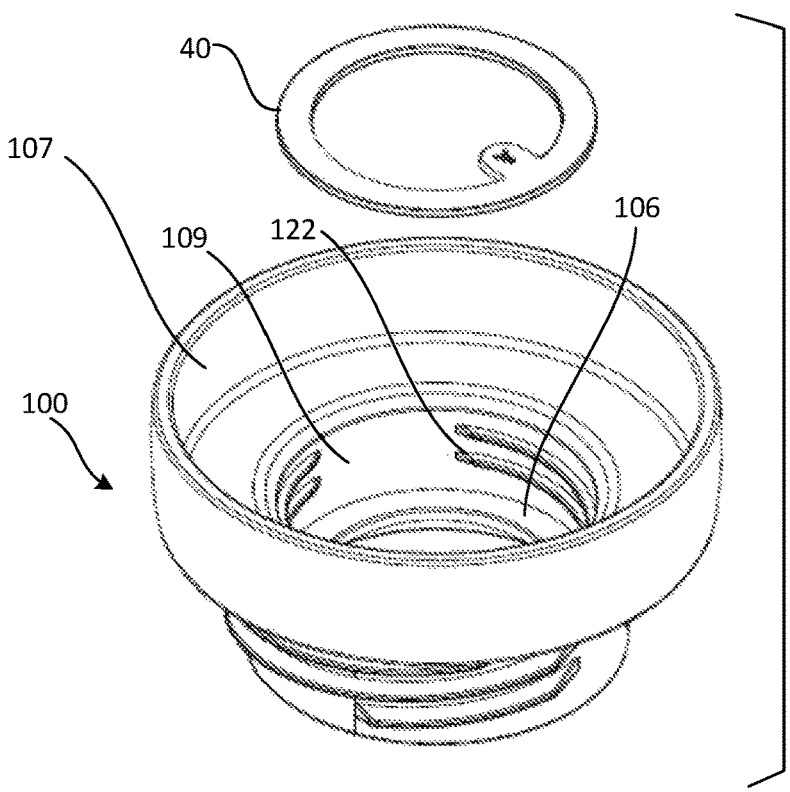
FIG. 12 is an exploded upper perspective view of the adapter and the bottle seal, according to an exemplary embodiment of the present subject disclosure.
Figure 13:
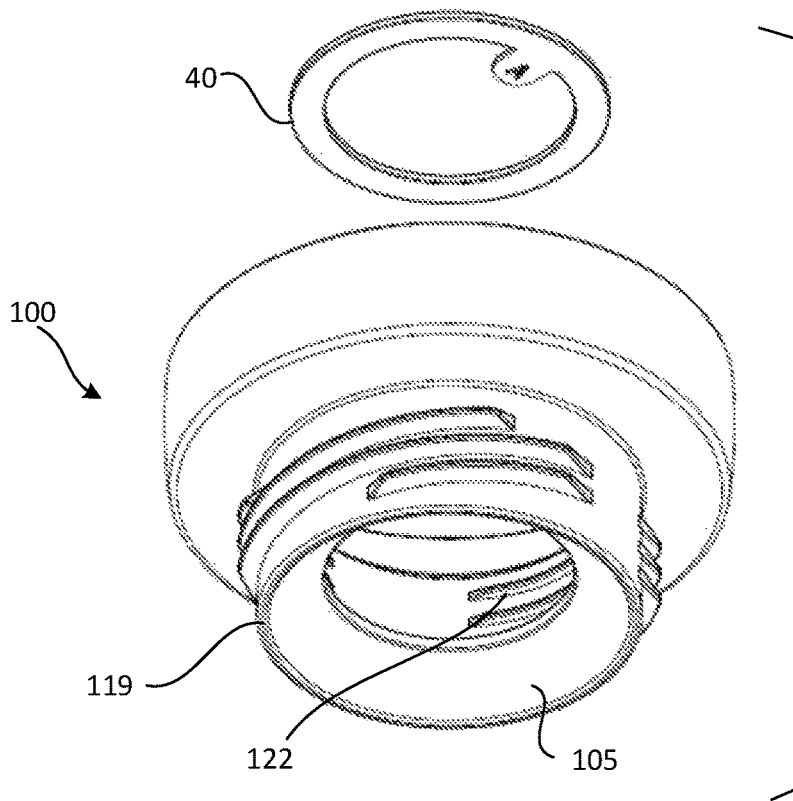
FIG. 13 is an exploded lower perspective view of the adapter and the bottle seal, according to an exemplary embodiment of the present subject disclosure.

As shown in FIG. 11, the first skirt portion 103 has an overall height of H1, and the second skirt portion 104 has an overall height of H2. The first skirt portion 103 contains the height of H1 and begins at the first end 101 and in a direction towards the second end 102. The second skirt portion 104 contains the height of H2 and begins at the second end 102 in a direction towards the first end 101. The height H2 of the second skirt portion 103 may be as small as the depth of the chamber 22 in the base 20 (see FIG. 2). The depth of the chamber 22 defined as the distance from the top of the base 23 and the channel 24. As a result, the second end 102 will press tightly against the base seal 30 situated at the bottom of the chamber 22. This will create a watertight seal between and adapter 100 and the base 20. In addition, the radial walls 25 (see FIG. 2) of the base 20 will be substantially in contact with the second exterior wall 110. Alternatively, the second skirt portion 104 may be shorter. The first skirt portion 103 may have varying lengths.

As shown in FIGS. 12-16, the second interior wall 109 may contain bottle fasteners 122 to secure the bottle neck 53 to the adapter 100. Alternatively, the first interior wall 107 may contain the bottle fasteners 122. The bottle fasteners 122 may be male or female and are adapted to mate with complementary fasteners 54 on the bottle 50. The bottle fasteners 54 may be situated above the ledge 106 within the adapter 100. As shown in FIG. 16, when the bottle 50 is secured to the adapter 100, the second end 52 of the bottle 50 is pressed tightly against the bottle seal 40 that is situated on the ledge 106. As a result, the bottle seal 40 is compressed and creates a watertight seal between the bottle 50 and the adapter 100.

Figure 14:
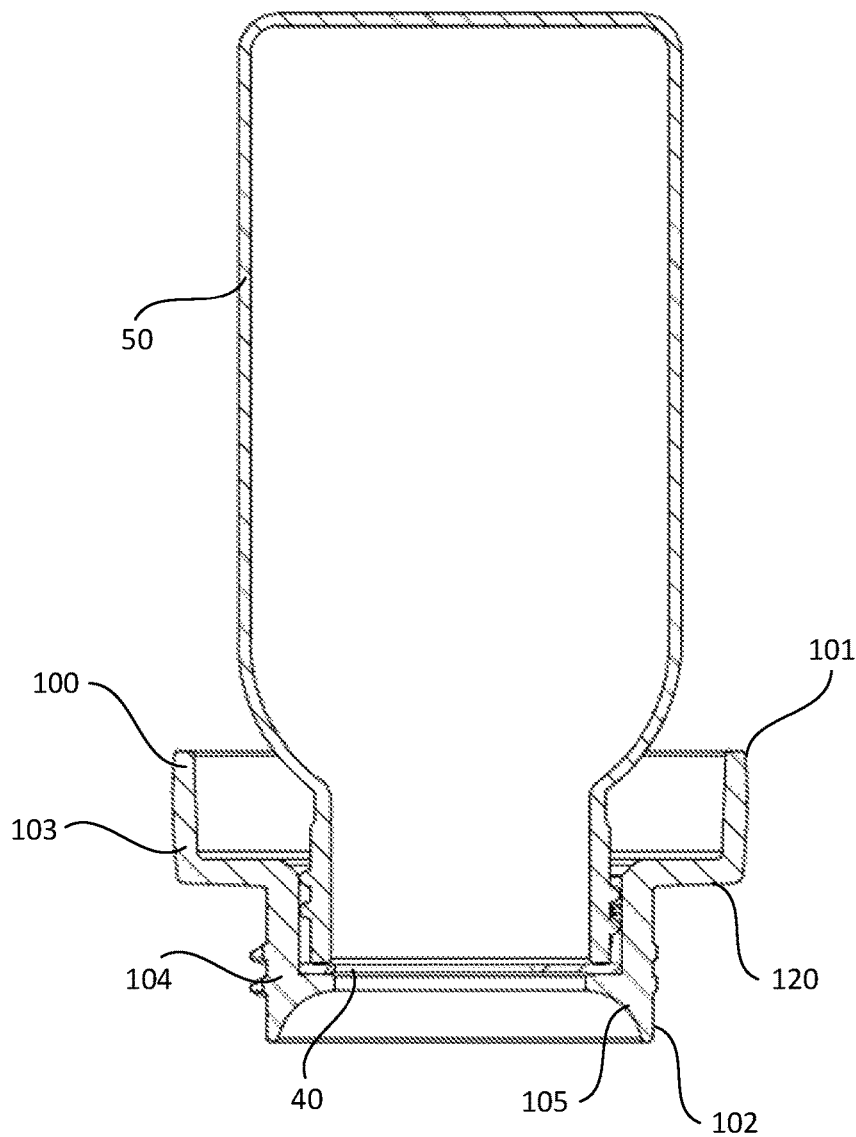
FIG. 14 is a cross section view of the bottle secured to the adapter and the bottle seal situated within, according to an exemplary embodiment of the present subject disclosure.
Figure 15:
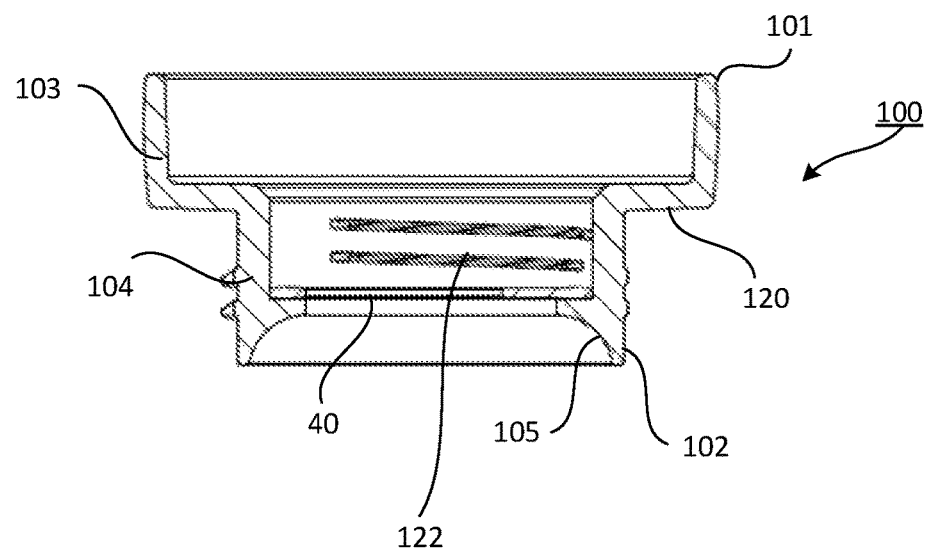
FIG. 15 is a cross sectional view of the adapter and the bottle seal situated within taken along section lines A-A in FIG. 9, according to an exemplary embodiment of the present subject disclosure.

FIG. 14 is a cross-section of the first embodiment of the adapter 100 secured to the bottle 50 with a bottle seal 40 situated between the bottle 50 and the adapter 100. FIG. 15 is a cross-section of the first embodiment of the adapter 100. In this embodiment, the first end 101 is larger in diameter than the second end 102. The first skirt portion 103 extends from the first end 101 towards the second end 102 and connects to the second skirt portion 104 at a shoulder 120. The diameter of the first skirt portion 103, that is defined as D2 (see FIG. 9) is large enough to cover the heated surface 21 (shown in FIG. 2) that surrounds the chamber 22 (shown in FIG. 2). Alternatively, D2 may be larger or smaller.

Figure 17:
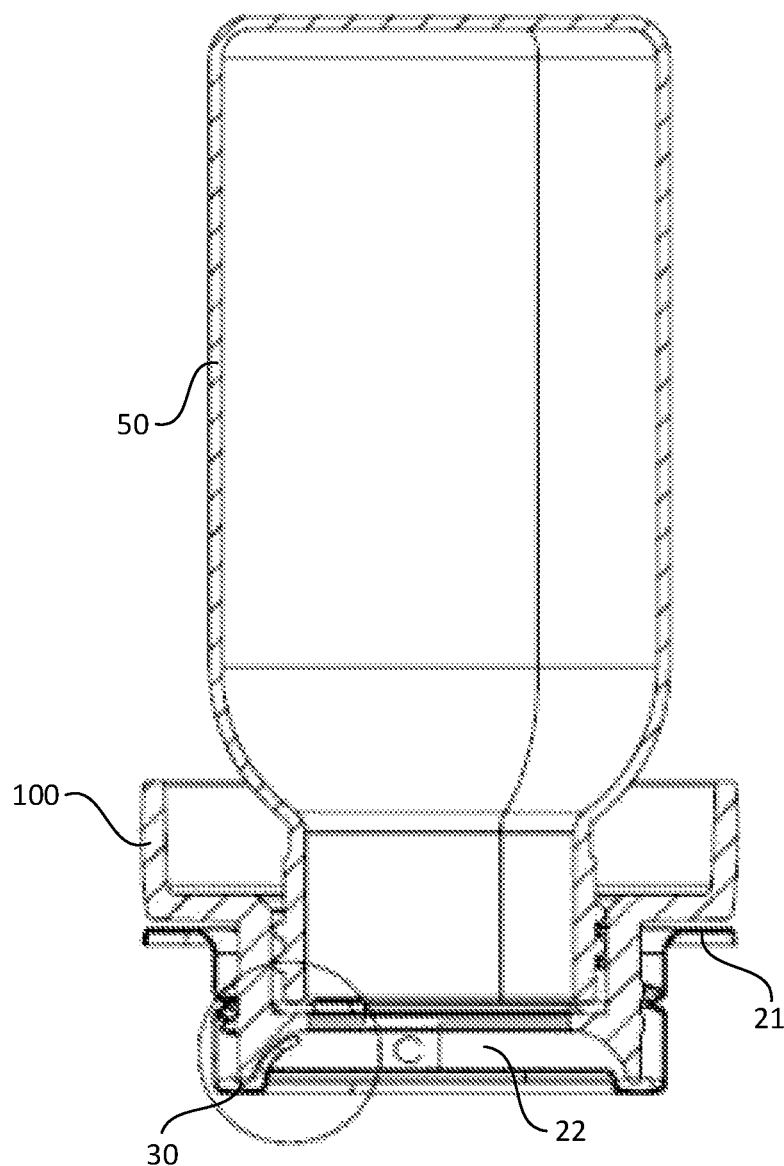
FIG. 17 is a partial cross section view of the bottle warmer assembly, excluding the bottom portion of the base, according to an exemplary embodiment of the present subject disclosure.
Figure 18:
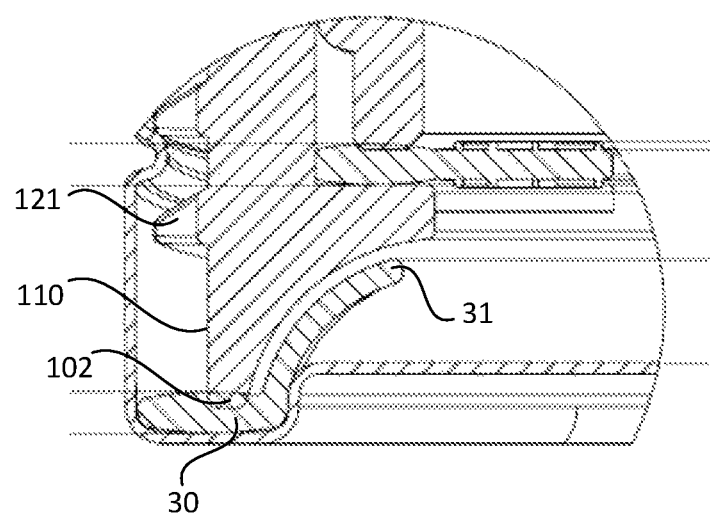
FIG. 18 is a partial section view of the bottle warmer assembly, taken at C in FIG. 17, according to an exemplary embodiment of the present subject disclosure.

FIGS. 16-18 show a partial cross-section view of the secured bottle warmer assembly 10, using the first embodiment of the adapter 100. The assembly 10 in these figures do not depict the portion of the base 20 (see FIG. 2) situated under the surface 21. During installation, the user places the base seal 30 within the channel 24 located in the chamber 22. The base seal 30 rests securely between the inner diameter 26 of the channel 24 and the outer diameter 27 of the channel 24.

The adapter 100 is then secured to the base 20 using the fasteners 121 located on the second exterior wall 110 on the second skirt portion 104, with the fasteners 28 located on the radial walls 25 of the base 20. The first skirt portion 103 of the adapter 100 allows the user to easily grip a part of the adapter 100 when securing the adapter 100 to the base 20. The base seal 30 in position creates a watertight seal once the adapter 100 is completely secured to the base 20.

The bottle seal 40 is then placed on the ledge 106 located inside the adapter 100. Holding the liquid filled bottle 50 right side up in one hand, and the base 20 with an adapter 100 secured therein, upside down in the other hand, the user secures the bottle 50 to the adapter 100 through the fastening 122 means located within the adapter 100. As a result, the open end 52 of the bottle 50 is pressed tightly against the bottle seal 40, creating a watertight seal.

Once secured, the assembly 10 is turned over again such that the base 20 is located right side up and the bottle 50 secured is now upside down. A portion of the liquid travels from the bottle 50 and into a pocket 60 created between the concave fillet 105 and the base of the chamber 22.

The user then turns on the heating element 29 within the base 20 in order to heat the surface 21. The liquid, now in direct contact with the surface 21 is heated until a desired temperature is reached. The order of the steps mentioned above is the preferred method in using the bottle warmer adapter 100, however the order of these steps can be interchanged based on a user's personal preference. For example, a user may first secure the adapter 100 to the bottle 50 before securing the adapter 100 to the base 20.

Once a desired temperature is reached, the base 20 is turned off and once again, the entire assembly 10 is flipped upside down (bottle opening 52 facing up) before removing the bottle 50 from the base 20. The concave fillet 105 allows the liquid located within the pocket to smoothly and efficiently travel back into the bottle 50. The concave filet 105 also minimizes any residual fluid which may be remain in the heating pocket 60 after the bottle opening 52 is positioned upwards again. The bottle 50, now held right side up, is unsecured from the adapter 100 by gripping the first skirt portion 103 and removing the bottle by un-securing it from the adapter 100. The bottle 50 and the heated liquid therein can now be used as desired.

The base seal 30 and the bottle seal 40 can be removed from their respective positions by using the pull tabs 31 and 41 located on the seals 30 and 40, respectively. The pull tabs 31 and 41 allow the user to easily remove the seals 30 and 40 and wash them as needed. Similarly, the adapter 100 can be removed from the base 20 to be cleaned and stored away for future use.

Figure 19:
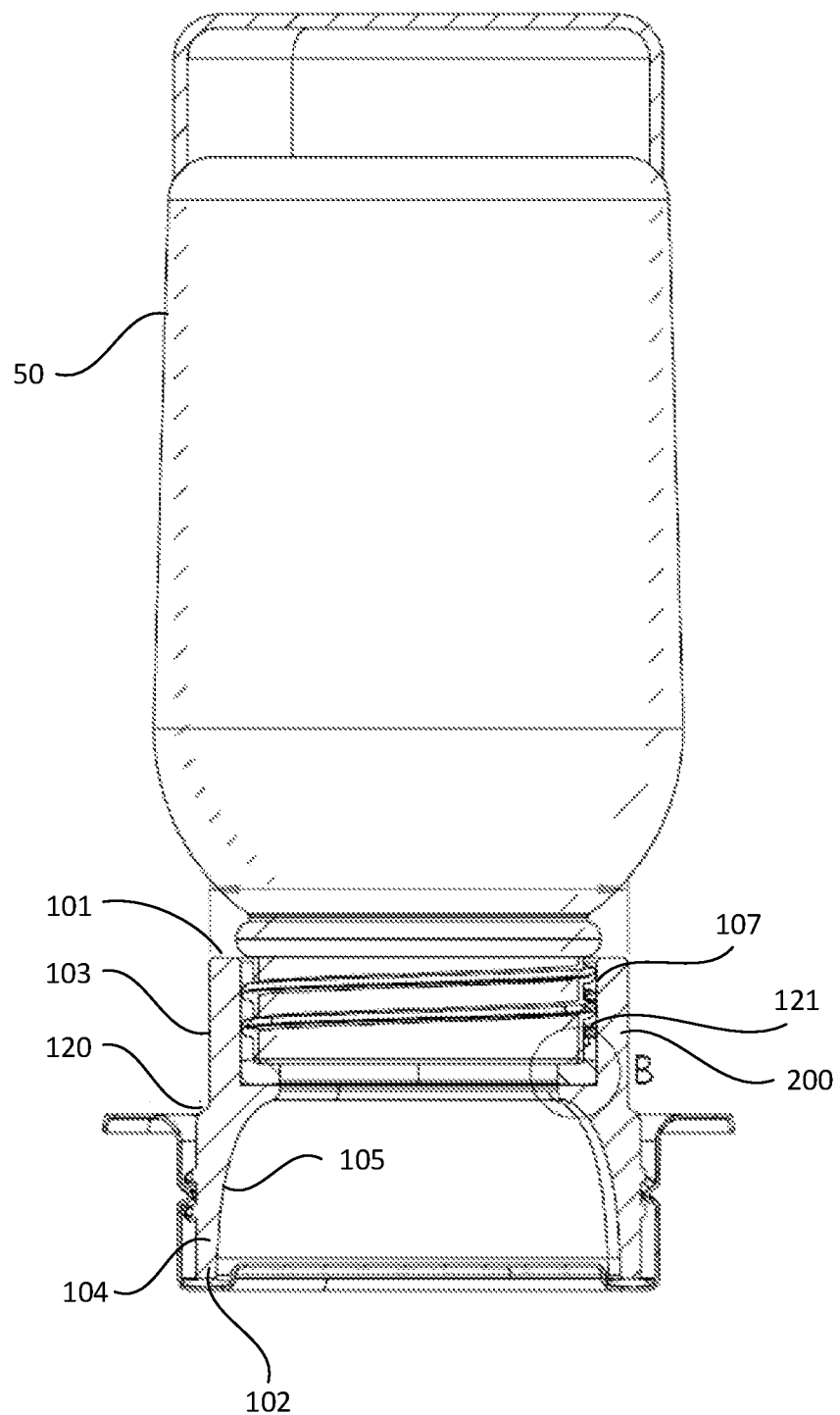
FIG. 19 is a cross section view of an adapter secured in the bottle warmer assembly, according to a second exemplary embodiment of the present subject disclosure.
Figure 20:
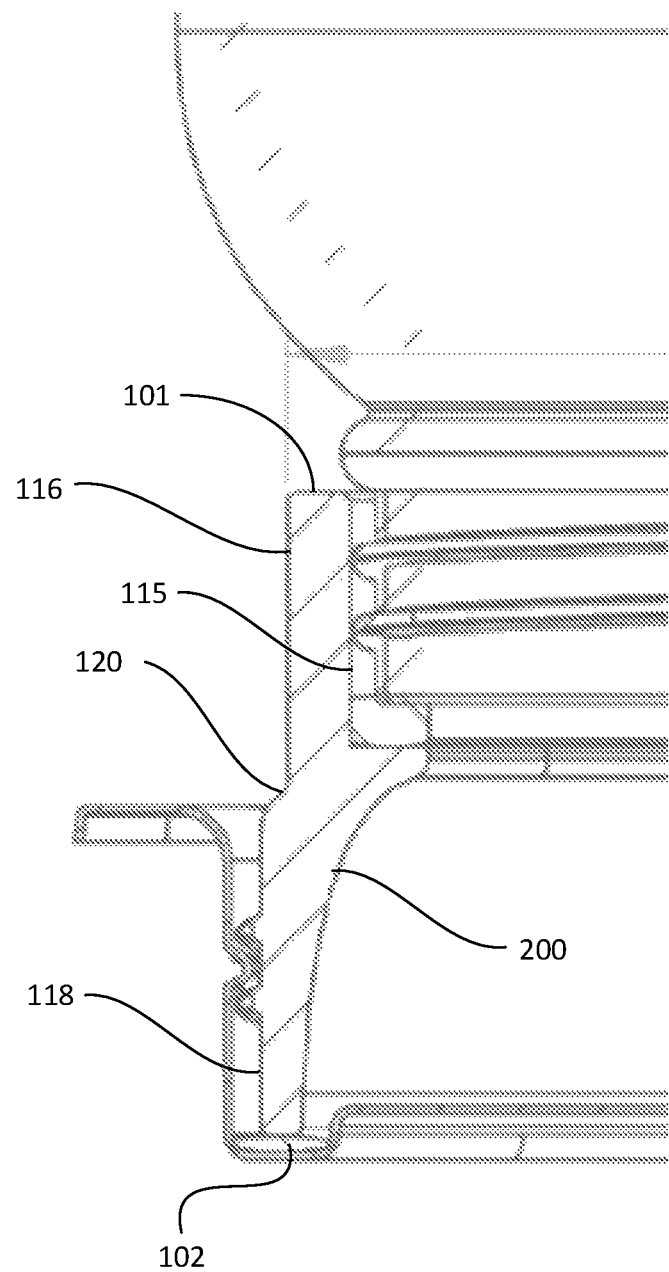
FIG. 20 is a partial cross section view of an adapter secured in a bottle warmer assembly, according to an exemplary embodiment of the present subject disclosure.

FIGS. 19-20 show a second embodiment of the adapter 200. In this embodiment the inner 115 diameter of the first end 101 of the adapter 100 is substantially similar to the diameter of the second end 52 of the bottle 50. The first interior wall 107 contains fasteners 121 to secure the bottle 50 to the adapter 100. In this embodiment the outer diameter 116 of the first end 101 is smaller than the outer diameter 118 of the second end 102. The first skirt portion 103 extends from the first end 101 in a direction towards the second end 102 and connects to the second skirt portion 104 at a shoulder 120. Alternatively, the first skirt 103 portion may be flush with the second skirt portion 104.

Figure 21:
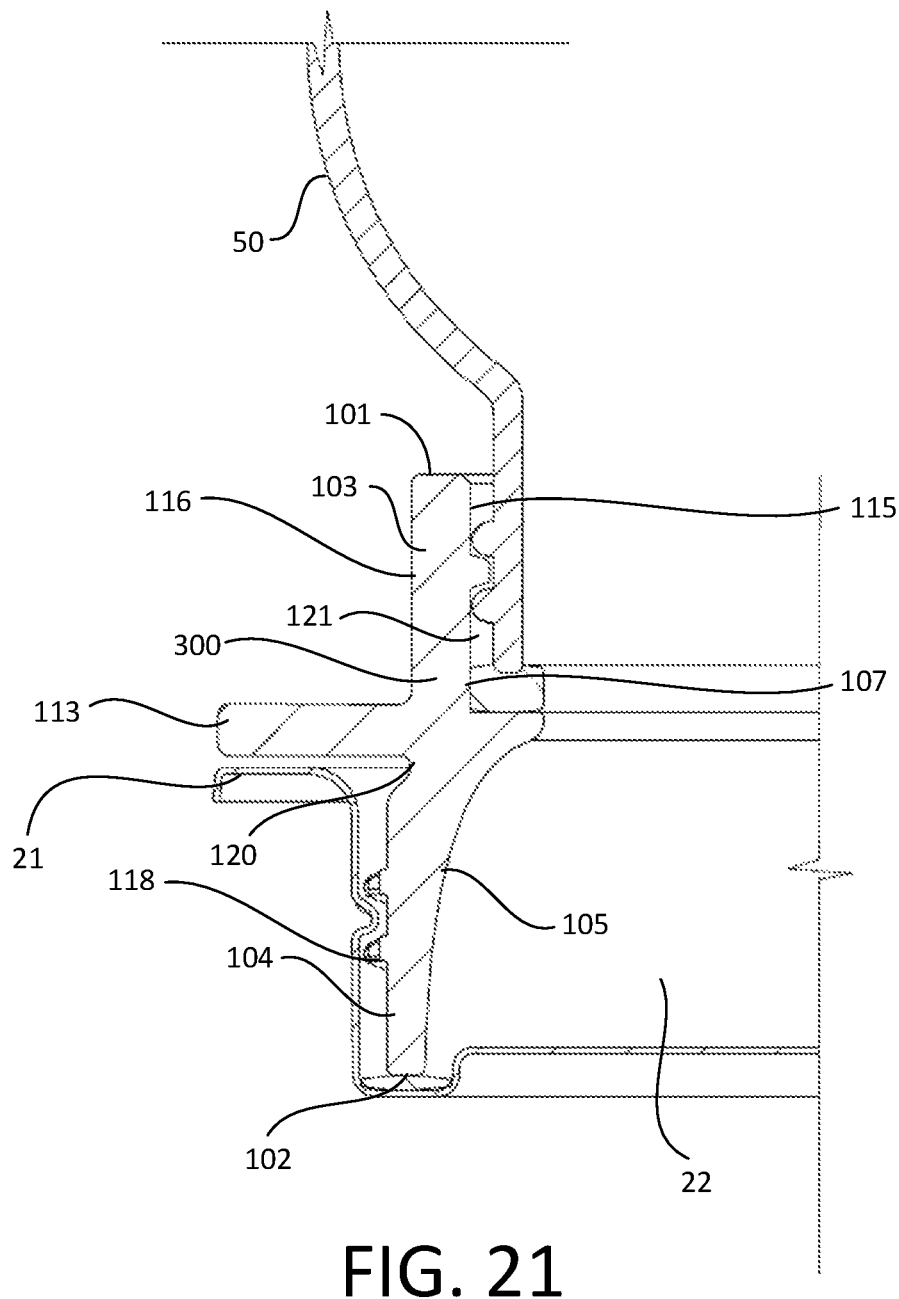
FIG. 21 is a partial section view of an adapter secured in a bottle warmer assembly, according to a third exemplary embodiment of the present subject disclosure.

FIG. 21 shows a third embodiment of the adapter 300. In this embodiment, the inner diameter 115 of the first end 101 of the adapter 300 is substantially similar to the diameter at the second end 52 of the bottle 50. The first interior wall 107 contains fasteners 121 to secure the bottle 50 to the adapter 100. The outer diameter 116 of the first end 101 is smaller than the outer diameter 118 of the second end 102. The first skirt portion 103 extends from the first end 101 in a direction to the second end 102 and connects to the second skirt portion 104 at a shoulder 120. Alternatively, the first skirt 103 portion may be flush with the second skirt portion 104. In addition, an outer radial ledge 113 surrounds the adapter 300 along the first exterior wall 108. The outer radial ledge 113 is located a predetermined distance from the first end 101. The outer radial ledge 113 may be large enough to cover the heated surface 21 surrounding the chamber 22. Alternatively, the outer radial ledge 113 may be larger or smaller.

Figure 22:
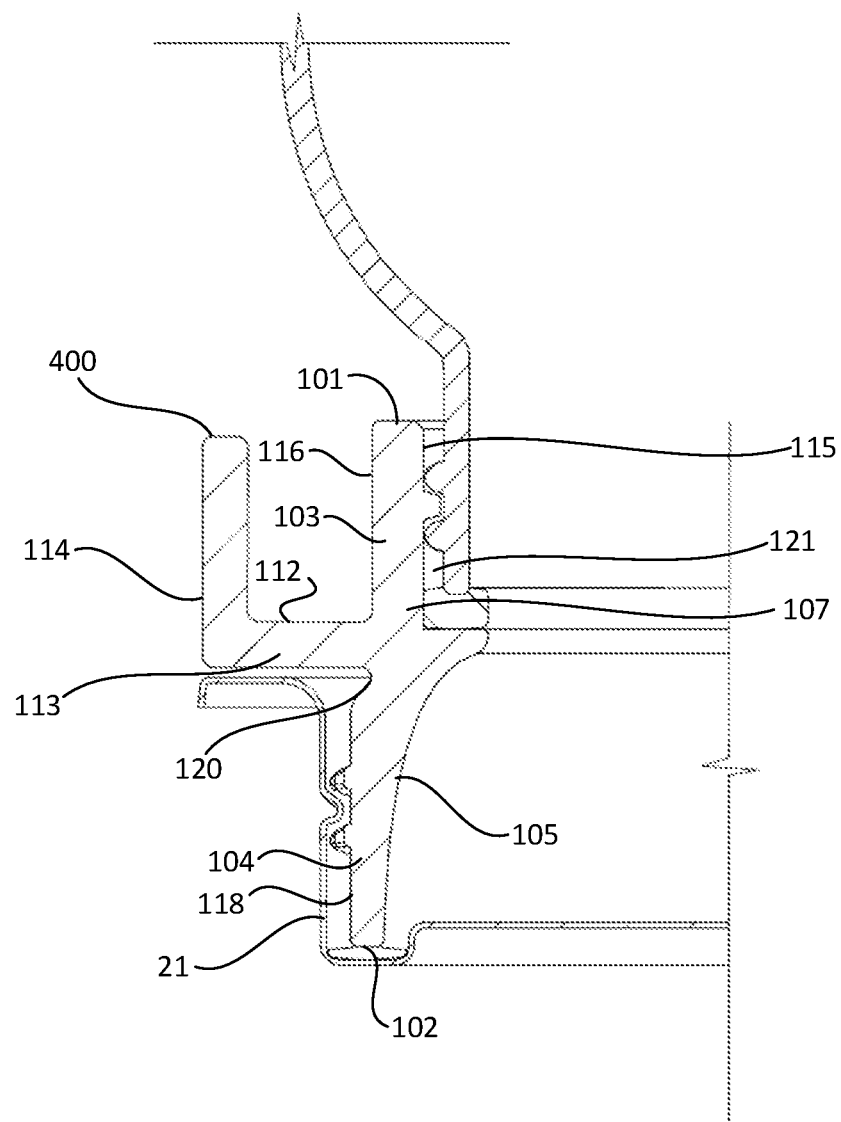
FIG. 22 is a partial section view of an adapter secured in a bottle warmer assembly, according to a fourth exemplary embodiment of the present subject disclosure.
Figure 23:
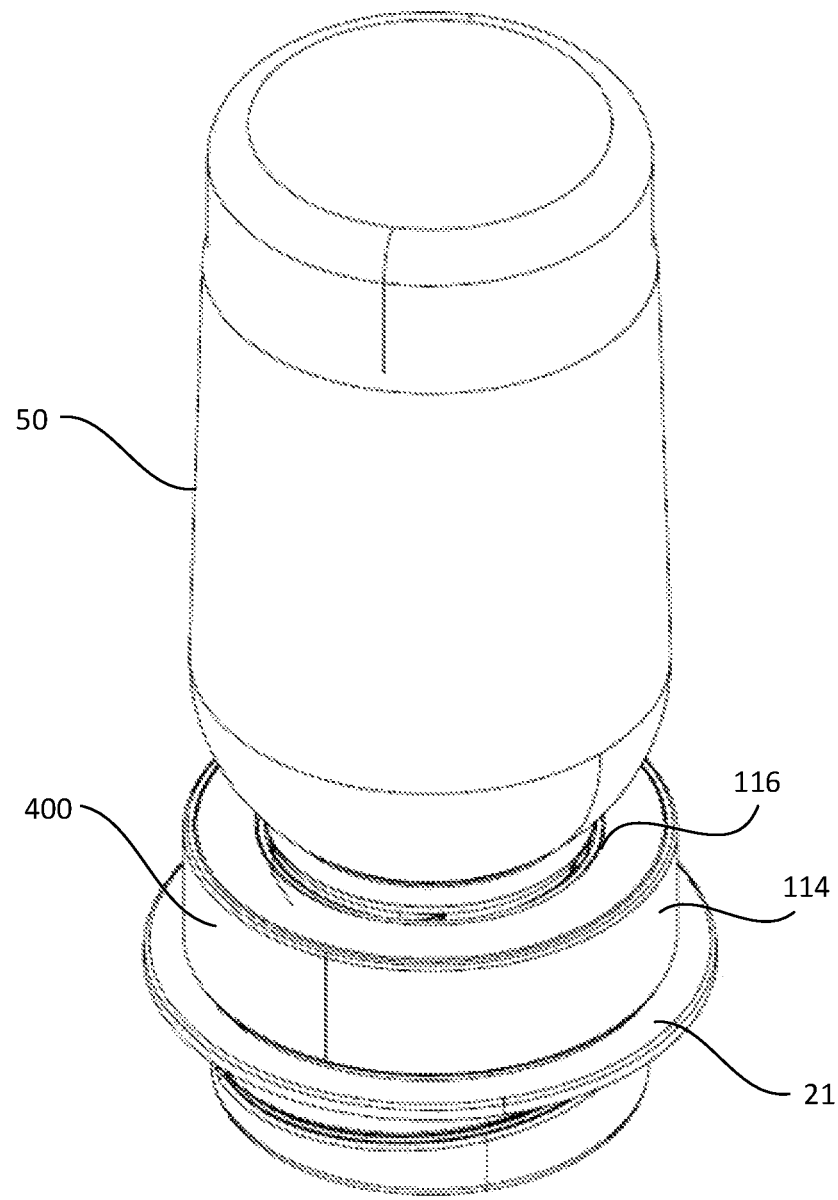
FIG. 23 is an upper perspective view of the adapter secured in the bottle warmer assembly excluding the bottom portion of the base, according to an exemplary embodiment of the present subject disclosure.

FIGS. 22-23 show a fourth embodiment of the adapter 400. In this embodiment, the inner diameter 115 of the first end 101 of the adapter 100 is substantially similar to the diameter at the open end 52 of the bottle 50. The first interior wall 107 contains fasteners to secure the bottle 50 to the adapter 400. The outer diameter 116 of the first end 101 is smaller than the outer diameter 118 of the second end 102. The first skirt portion 103 extends from the first end 101 in a direction towards the second end 102 and connects to the second skirt portion 104 at a shoulder 120. Alternatively, the first skirt 103 portion may be flush with the second skirt portion 104. In addition, the outer ledge 113 radially surrounds the adapter 400 along the first exterior wall 108. The outer ledge 113 is located a predetermined distance from the first end 101. The outer ledge 113 may be large enough to cover the heated surface 21 surrounding the chamber 22. Alternatively, the diameter of the outer ledge 113 may be larger or smaller. An exterior radial skirt 114 extends perpendicularly from the outer ledge 113 in a direction towards the first end 101. As a result, a channel 112 is created between the exterior radial skirt 114 and the first skirt 103. The radial skirt 114 provides additional leverage to a user to be able to handle the adapter better during use and handling.

Figure 24:
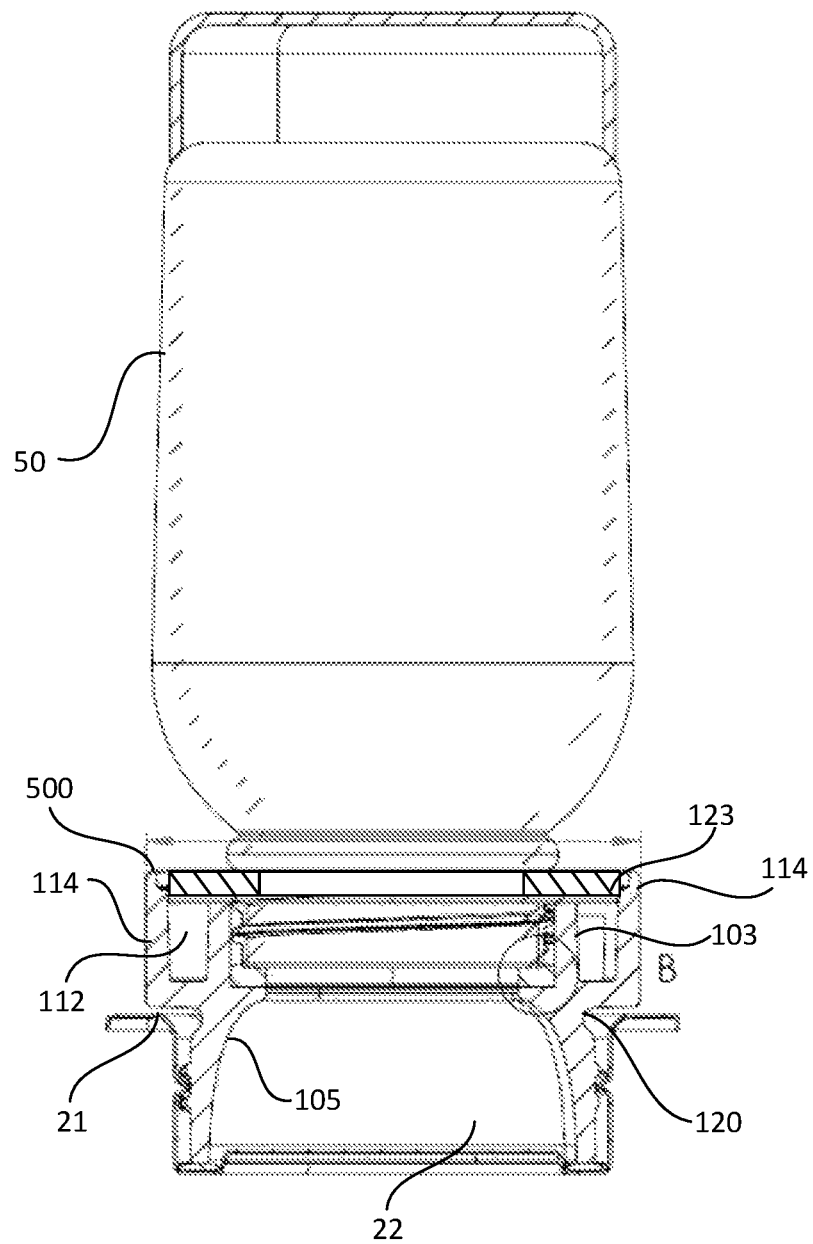
FIG. 24 is a cross section view of the adapter secured in the bottle warmer assembly excluding the bottom portion of the base, according to an exemplary embodiment of the present subject disclosure.

The embodiments mentioned above can have varying differences that may allow for easier use or alternate uses. For example, FIG. 24 shows a fifth embodiment of the adapter 500. The fourth embodiment of the adapter 400 and the fifth embodiment only differ in the size of the first skirt portion 103. In the fifth embodiment, the first skirt portion 103 is shorter than the exterior skirt 114. This allows for a cap 123 to be placed within the first end 101 of the adapter 500. The cap 123 allows for a more finished adapter configuration with no exposed channel 112.

The illustrations and examples provided herein are for explanatory purposes and are not intended to limit the scope of the appended claims. It will be recognized by those skilled in the art that changes, or modifications may be made to the above-described embodiments without departing from the broad inventive concepts of the invention. It is understood therefore that the invention is not limited to the particular embodiments which are described but is intended to cover all modifications and changes within the scope and spirit of the invention.

What is claimed:

1. A bottle warmer, comprising:
   a base housing having an internal heating element, and an open top chamber with a threaded interior which is adapted to mate with an inverted bottle or an adapter;
   a circular channel positioned at a base portion of the top chamber; and
   a circular base seal adapted to fit within the channel and create a leak-proof barrier with a bottle or an adapter attached to the top chamber, the base seal having a pull tab to facilitate removal from the circular channel.

2. The bottle warmer of claim 1, further comprising an adapter positioned between the top chamber of the base and a bottle, wherein the adapter comprises:
   a cylindrical sleeve having a first end and a second end;
   a first skirt portion with a first diameter at the first end;
   a second skirt portion with a second diameter at the second end and connected to the first skirt portion at a shoulder junction;
   a first fastener disposed on an inner surface of the cylindrical sleeve;
   a second fastener disposed on an outer surface of the second skirt portion; and
   an inward ledge within cylindrical sleeve such that the first fastener is positioned above the inward ledge.

3. The bottle warmer of claim 2, wherein the first diameter is larger than the second diameter.

4. The bottle warmer of claim 2, wherein the inward ledge is formed from a concave fillet extending radially inward from the second end towards the first end.

5. The bottle warmer of claim 2, wherein the first skirt is gripped to twist and tighten the adapter to the base.

6. The bottle warmer of claim 2, wherein the base seal is disposed between the second end and the channel.

7. The bottle warmer of claim 2, further comprising a bottle seal that is adapted to fit on top of the inward ledge and adjacent the first fastener.

8. The bottle warmer of claim 7, wherein the bottle seal contains a pull tab.

9. The bottle warmer of claim 8, wherein indicia is disposed on the pull tab of the bottle seal.

10. The bottle warmer of claim 2, wherein an outer ledge extends radially outward from the cylindrical sleeve at a predetermined distance from the first end.

11. The bottle warmer of claim 1, wherein the base seal pull tab extends from the base seal at an upward angle radially inward.

12. The bottle warmer of claim 11, wherein indicia is disposed on the pull tab of the base seal.

13. A bottle warmer, comprising:
   a base housing having an internal heating element, and an open top chamber with a threaded interior which is adapted to mate with an inverted bottle or an adapter;
   a circular channel positioned at a base portion of the top chamber;
   a circular base seal adapted to fit within the channel and create a leak-proof barrier with a bottle or an adapter attached to the top chamber, the base seal having a pull tab to facilitate removal from the circular channel; and
   an adapter having a first skirt portion and a second skirt portion, wherein the second skirt portion has a threaded interior wall which is adapted to mate with the threaded portion of a bottle, and the second skirt portion has a threaded exterior wall which is adapted to mate with the threaded interior of the top chamber.

14. The bottle warmer of claim 13, further comprising a bottle seal that is adapted to be positioned on a base portion of the interior of the first skirt portion.

15. The bottle warmer of claim 14, wherein the bottle seal contains a pull tab.

16. The bottle warmer of claim 13, wherein the first diameter is larger than the second diameter.

17. A bottle warmer, comprising:
- a base housing having an internal heating element, and an open top chamber with a threaded interior which is adapted to mate with an inverted bottle or an adapter;
- a circular channel positioned at a base portion of the top chamber;
- a circular base seal adapted to fit within the channel and create a leak-proof barrier with a bottle or an adapter attached to the top chamber, the base seal having pull tab to facilitate removal from the circular channel;
- an adapter having a first skirt portion with a first diameter and a second skirt portion with a second diameter that is smaller than the first diameter, wherein the second skirt portion has a threaded interior wall which is adapted to mate with the threaded portion of a bottle, and the second skirt portion has a threaded exterior wall which is adapted to mate with the threaded interior of the top chamber; and
- a bottle seal having a pull tab that is adapted to be positioned on a base portion of the interior of the first skirt portion.

* * * * *